UNITED STATES PATENT OFFICE.

JACQUES THÉODORE GATEAU, OF AIX-EN-PROVENCE, FRANCE.

PHOTOGRAPHIC EMULSION.

No. 905,306.   Specification of Letters Patent.   Patented Dec. 1, 1908.

Application filed August 13, 1907. Serial No. 388,427.

*To all whom it may concern:*

Be it known that I, JACQUES THÉODORE GATEAU, citizen of the French Republic, residing at Aix-en-Provence, France, have invented certain new and useful Improvements in Photographic Emulsions, of which the following is a specification.

The present invention relates to a photographic emulsion for pigment printing. Up to the present for said printing process sensitive mixtures have been used which consist of chrome-compounds and albuminous substances. It is further known to employ a mixture of common albumen with ferric ammonium citrate.

According to the present invention instead of the chrome compounds, ferric salts, cerium-salts and uranium-salts are employed and they are not mixed with the common albumens or with any other albuminous substance whatsoever, but with alkaline-albuminates or acidic albumens. These albuminates and albumens are substances which are insoluble in pure water, but which are soluble without any alteration by means of neutral salts, alkalies or acids, and which can again be precipitated from these solutions, (animal or vegetable caseins and similar materials). When these derivates of albumens are exposed to the light after they have been mixed with a ferric salt which, when exposed to the light decomposes in developing an insoluble oxid, they become less easily soluble in their ordinary solvents. In this manner emulsions can be produced by means of ferric salts, cerium salts and uranium salts, the sensitiveness of which is nearly equal to the sensitiveness of chrome-salt emulsions and which consequently are adapted to replace said chrome-salt emulsions.

To produce the colloidal substances, the albuminous substances are dissolved in water, to which previously a solvent (ammonia, borax, carbonate of soda etc.) has been added; hereupon the ferric salt is added and further the pigment and the emulsion is spread on a glass slab or paper. The sensitiveness of the sensitive paper which has thus been produced, can be further increased through the addition of coloring substances, such as, for example, metallic violet etc.; in this manner the papers are sensitized for the yellow and red rays.

After the paper has been exposed behind a plate, the photograph is developed in a bath which is adapted to dissolve the albuminous substance (ammonia, carbonate of soda, oxalate of potassium). These papers offer, compared with the chrome-papers, the advantage, that, although being nearly so sensitive as these, they keep a much longer time after they have been sensitized.

*Examples.*

1.—5 grams of anhydrous casein is dissolved in 75 grams of water, which contains 2 cubic centimeters of ammonia. $2\frac{1}{2}$ grams of ferric ammonium citrate are added, pigment is admixed and the substance is spread on paper.

2.—The ferric ammonium citrate of the compound described in Example 1. may be replaced by 2 grams of sulfate of cerium and 5 decigrams of tartaric acid, which are dissolved in ammoniac water.

What I claim as my invention is:—

A photographic emulsion for pigment paper consisting of one of the albumens which are insoluble in pure water but soluble without any alteration by means of neutral salts, alkalies and acids, and which can be precipitated from their solutions, and of a ferric salt admixed with the said albumen.

In testimony whereof I have hereunto set my hand in presence of two subscribing witnesses.

JACQUES THÉODORE GATEAU.

Witnesses:
ALLAN MACFARLANE,
GEORGE WASHINGTON.